(12) United States Patent
Chambliss et al.

(10) Patent No.: US 8,521,700 B2
(45) Date of Patent: Aug. 27, 2013

(54) APPARATUS, SYSTEM, AND METHOD FOR REPORTING ON ENTERPRISE DATA PROCESSING SYSTEM CONFIGURATIONS

(75) Inventors: David Darden Chambliss, Morgan Hill, CA (US); Divyesh Jadav, San Jose, CA (US); Prashant Pandey, San Jose, CA (US); Kaladhar Voruganti, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1473 days.

(21) Appl. No.: 11/562,670

(22) Filed: Nov. 22, 2006

(65) Prior Publication Data

US 2008/0120320 A1     May 22, 2008

(51) Int. Cl.
G06F 7/00       (2006.01)
G06F 17/00      (2006.01)
G06F 17/30      (2006.01)

(52) U.S. Cl.
USPC ............ 707/688; 707/694; 707/695; 707/806

(58) Field of Classification Search
USPC ........... 707/638, 688, 694, 695, 806, 999.102
See application file for complete search history.

(56) References Cited

U.S. PATENT DOCUMENTS

| | | | | |
|---|---|---|---|---|
| 5,623,598 A * | 4/1997 | Voigt et al. | ...................... | 714/47 |
| 6,199,070 B1 * | 3/2001 | Polo-Wood et al. | .................. | 1/1 |
| 6,377,993 B1 * | 4/2002 | Brandt et al. | ................. | 709/227 |
| 6,473,794 B1 * | 10/2002 | Guheen et al. | ................ | 709/223 |
| 6,763,347 B1 * | 7/2004 | Zhang | ........................... | 711/117 |
| 6,826,715 B1 * | 11/2004 | Meyer et al. | .................... | 714/37 |
| 6,975,963 B2 * | 12/2005 | Hamilton et al. | ............. | 702/182 |
| 6,988,054 B2 | 1/2006 | Giffords | ........................ | 702/186 |
| 7,080,095 B2 * | 7/2006 | Accardi et al. | ......................... | 1/1 |
| 7,225,249 B1 * | 5/2007 | Barry et al. | .................... | 709/227 |
| 7,315,826 B1 * | 1/2008 | Guheen et al. | .................... | 705/7 |
| 7,315,903 B1 * | 1/2008 | Bowden | ........................ | 709/250 |
| 7,398,272 B2 * | 7/2008 | Hindawi et al. | ............... | 709/203 |
| 7,685,269 B1 * | 3/2010 | Thrasher et al. | .............. | 709/224 |
| 7,756,840 B2 * | 7/2010 | Warshawsky | ................. | 707/688 |
| 7,886,031 B1 * | 2/2011 | Taylor et al. | .................... | 709/221 |
| 2001/0020254 A1 * | 9/2001 | Blumenau et al. | ............ | 709/229 |
| 2002/0035504 A1 * | 3/2002 | Dver et al. | ...................... | 705/10 |
| 2003/0093709 A1 * | 5/2003 | Ogawa et al. | ..................... | 714/4 |
| 2003/0115179 A1 * | 6/2003 | Prabakaran et al. | ............. | 707/1 |
| 2003/0220898 A1 * | 11/2003 | Hoffman et al. | ................... | 707/1 |
| 2004/0030880 A1 * | 2/2004 | Kitagawa | .......................... | 713/1 |
| 2004/0221049 A1 * | 11/2004 | Blumenau et al. | ............ | 709/229 |
| 2005/0033777 A1 * | 2/2005 | Moraes et al. | ................. | 707/202 |
| 2005/0086554 A1 * | 4/2005 | Simes | ............................... | 714/4 |

(Continued)

OTHER PUBLICATIONS

A. J. Cuthbertson et al., "A Disk Space Management System", Quaestiones Informaticae, vol. 2 No. 3, Sep. 1983, pp. 29-32.

(Continued)

*Primary Examiner* — Wilson Lee
*Assistant Examiner* — Mark E Hershley
(74) *Attorney, Agent, or Firm* — Kunzler Law Group

(57) ABSTRACT

An apparatus, system, and method are disclosed for reporting on enterprise data processing system configurations. A collection module records a plurality of entity configurations for a DPS in a history database. In one embodiment, a selection module selects a subset of entities of the DPS. A report module generates a historical report of the plurality of entity configurations. In addition, the report module may generate the historical report for the selected subset of the entities.

31 Claims, 10 Drawing Sheets

(56) References Cited

U.S. PATENT DOCUMENTS

2005/0160481 A1* 7/2005 Todd et al. .................. 726/30
2005/0278342 A1* 12/2005 Abdo et al. .................. 707/10
2006/0031631 A1* 2/2006 Abe et al. .................. 711/112
2006/0178918 A1* 8/2006 Mikurak ..................... 705/7
2006/0248165 A1* 11/2006 Sridhar et al. ............. 709/218
2007/0115940 A1* 5/2007 Kamen et al. .............. 370/352
2007/0282643 A1* 12/2007 Okabe et al. ................ 705/7

OTHER PUBLICATIONS

H Hempy, "IBM 3850 Mass Storage System, Performance Evaluation Using A Channel Monitor", Computer Performance book by IBM Corp., Aug. 1977, pp. 177-196.

* cited by examiner

1000

805

| Date | Modification | Policy Violation | }— 830 |
| --- | --- | --- | --- |
| 1005—7/31 | Add RAID Cntrl 2546 | Configured as RAID 1 }—1010 |
| | 1015 | 1020 |

| Identifier | July 31 | }— 835 |
| --- | --- | --- |
| Data Transfers | 10360 TB | }— 810 |
| Capacity | 1062 TB | }— 815 |
| Failures | 13 | }— 820 |
| Storage Loops | 23 | }— 1105 |
| Disk Drives | 437 | }— 1110 |

| Date | Modification | Initiator | 830 |
|------|--------------|-----------|-----|
| 6/09 | Replace Disk 71204 | Bob | |
| 6/21 | Add RAID Cntrl 2541 | Mary | |
| 7/03 | RAID Cntrl 2541 to RAID 2 | Mary | |
| 7/31 | Add RAID Cntrl 2546 | Mary | |
| 1005 | 1205 | 1210 | |

FIG. 12

APPARATUS, SYSTEM, AND METHOD FOR REPORTING ON ENTERPRISE DATA PROCESSING SYSTEM CONFIGURATIONS

BACKGROUND OF THE INVENTION

1. Field of the Invention

This invention relates to enterprise data processing systems and more particularly relates to reporting on enterprise data processing system configurations.

2. Description of the Related Art

Enterprise data processing systems have steadily grown in size and in complexity. An enterprise data processing system (DPS) may include multiple data processing centers, and each data processing center may include many servers, mainframe computers, storage subsystems with storage devices, communication devices, and the like. Administrators may regularly modify the configurations of system devices. In addition, devices may be added and removed frequently.

Management tools have been created to aid in managing a DPS. For example, a management tool may enable an administrator to remote monitor the devices that comprise the DPS, and the configurations of those devices. Using management tools, the administrator may make decisions regarding the DPS based on the current state of the DPS.

The administrator may use a report from the management tool to determine how to optimally manage the DPS. For example, the administrator may decide to add a storage subsystem to the DPS as in response to a report showing the current storage subsystems are over utilized.

Unfortunately, management tool reports are directed to the current status of a DPS. As a result, the administrator typically lacks insight into the strength of any trends that may have resulted in the need for modifications to the DPS. Continuing the example above, although the administrator may know that current storage subsystems are over utilized from a management tool report, the report may not reveal how rapidly storage subsystem utilization is increasing.

SUMMARY OF THE INVENTION

From the foregoing discussion, it should be apparent that there is a need for an apparatus, system, and method that provide historical reports on an enterprise data processing system (DPS). Beneficially, such an apparatus, system, and method would provide valuable management information to an administrator.

The present invention has been developed in response to the present state of the art, and in particular, in response to the problems and needs in the art that have not yet been fully solved by currently available DPS management systems. Accordingly, the present invention has been developed to provide an apparatus, system, and method for managing a data processing system that overcome many or all of the above-discussed shortcomings in the art.

The DPS reporting apparatus is provided with a plurality of modules configured to functionally execute the steps of recording entity configurations and generating a historical report. These modules in the described embodiments include a collection module and a report module. In addition, the apparatus may include a selection module.

The collection module records a plurality of entity configurations for a DPS in a history database. In one embodiment, the selection module selects a subset of entities of the DPS. The report module generates a historical report of the plurality of entity configurations. In addition, the report module may generate the historical report for the selected subset of the entities.

In one embodiment, the historical report is a function-of-time report that shows configuration data for at least two specified entity configurations. The historical report may also be a system difference report that illustrates differences between at least two specified entity configurations. In an embodiment, the historical report is a policy check report that identifies violations of a policy in a modification from a first entity configuration to a second entity configuration. Alternatively, the historical report may be a point-in-time report that shows enterprise data processing system configuration data for a specified entity configuration. In a certain embodiment, the historical report is an audit report that shows identities of users making changes to entity configurations. The apparatus provides management reports that include historical information. The reports may guide an administrator in managing the DPS.

A system of the present invention is also presented for managing a DPS. The system may be embodied in a DPS. In particular, the system, in one embodiment, includes the DPS and a computer. The DPS may include a plurality of data processing devices, storages devices, and communication devices in mutual communication through at least one communication channel. The computer is also in communication with the DPS.

The computer includes a collection module, a selection module, and report module. The collection module records a plurality of entity configurations for a DPS in a history database. The selection module selects a subset of entities of the DPS. The report module may generate the historical report for the selected subset of the entities. The system provides information on past DPS configurations through the historical report.

A method of the present invention is also presented for reporting on historical DPS configurations. The method in the disclosed embodiments substantially includes the steps to carry out the functions presented above with respect to the operation of the described apparatus and system. In one embodiment, the method includes recording entity configurations and generating a historical report.

A collection module records a plurality of entity configurations for a DPS in a history database. In one embodiment, a selection module selects a subset of entities of the DPS. A report module generates a historical report of the plurality of entity configurations. In addition, the report module may generate the historical report for the selected subset of the entities. The method reports historical entity configurations for use in managing the DPS.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention records a plurality of entity configurations for a DPS. In addition, the present invention generates a historical report from the plurality of entity configurations. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 10 is an illustration of one embodiment of a policy check report of the present invention;

FIG. 11 is an illustration of one embodiment of a point-in-time report of the present invention; and FIG. 12 is an illustration of one embodiment of an audit report of the present invention.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
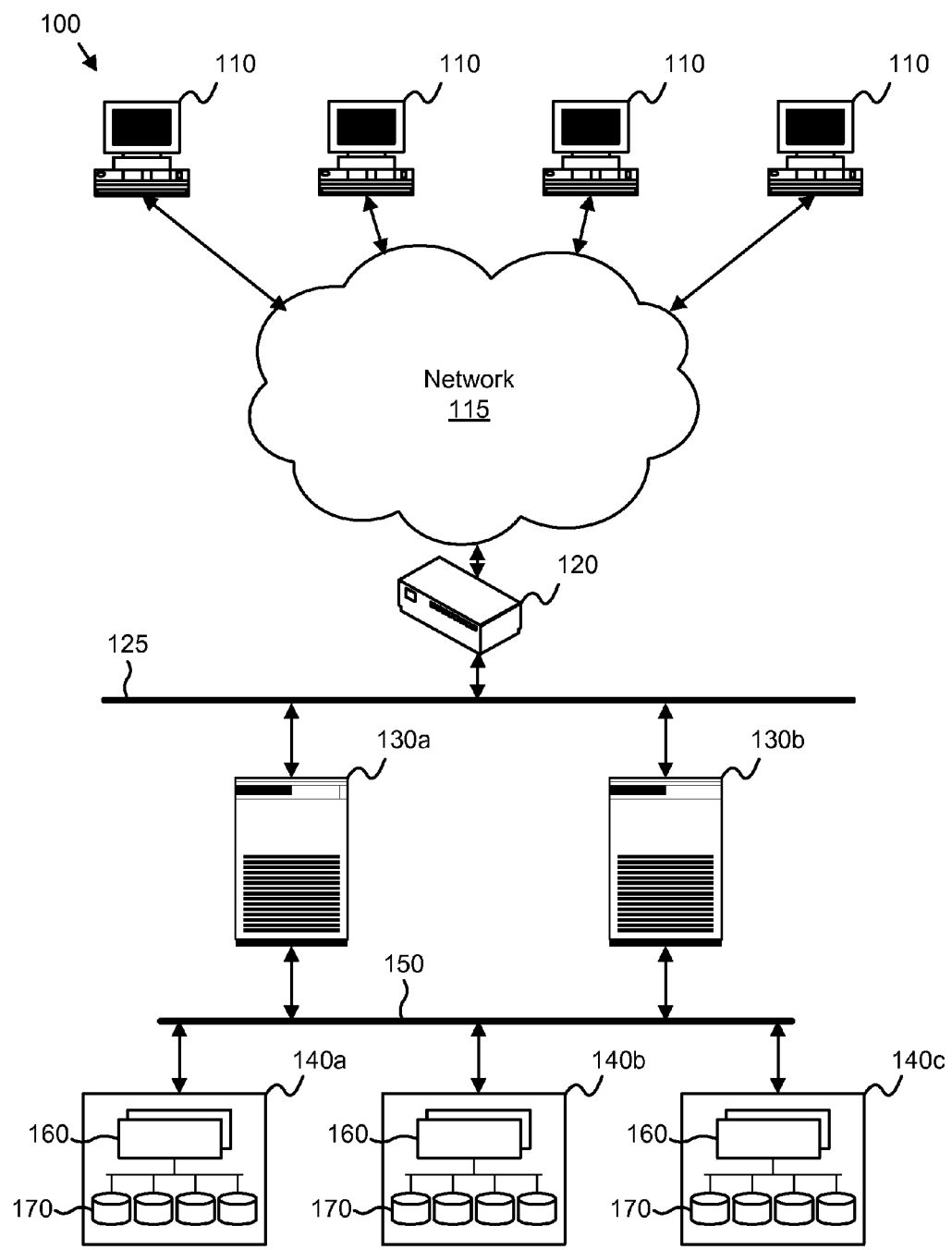
FIG. 1 is a schematic block diagram illustrating one embodiment of an enterprise data processing system in accordance with the present invention.

FIG. 1 is a schematic block diagram illustrating one embodiment of an enterprise data processing system (DPS) 100 in accordance with the present invention. The DPS 100 includes one or more client computers 110, a network 115, a router 120, an internal network 125, one or more servers 130, a storage communications channel 150, and one or more storage subsystems 140.

As used herein, the client computers 110 are referred to as clients 110. The servers 130 may also be configured as mainframe computers, blade centers comprising multiple blade servers, and the like. The storage communications channel can be configured in a variety of ways, such as a bus or as a Storage Area Network (SAN), and can use any of the well known storage protocols in the literature, including, but not limited to, small computer system interface (SCSI), iSCSI, Data Center Ethernet (DCE), Fibre Channel, etc. Although for simplicity four clients 110, one network 115, one router 120, one internal network 125, two servers 130, one storage communications channel 150, and three storage subsystems 140 are shown, any number of clients 110, networks 115, routers 120, internal networks 125, servers 130, storage communications channels 150 and storage subsystems 140 may be employed. One of skill in the art will also readily recognize that the DPS 100 could include other data processing devices such as bridges, scanners, printers, and the like.

Each storage subsystem 140 includes one or more storage controllers 160 and one or more storage devices 170. The storage subsystems 140 could be homogeneous, such as from the same vendor, and of the same model and version number, or heterogeneous, such as for example, a storage subsystem 140 with an IBM DS8000, EMC Symmetrix, and Engenio 4000. The storage devices 170 may be hard disk drives, optical storage devices, magnetic tape drives, micromechanical storage devices, holographic storage devices, and semiconductor storage devices.

In one embodiment, the DPS 100 provides data storage and data manipulation services for the clients 110. For example, a client 110 may access data stored on a storage device 170 of a storage subsystem 140 by communicating a request through the network 115, the router 120, the internal network 125, a server 130, and the storage communications channel 150 to a storage controller 160 for the storage device 170. The storage controller 160 may retrieve the data from the storage device 170 and communicate the data to the client 110. In one embodiment, the server 130 may execute a database application used by the client 110 to access the data.

The elements of the DPS 100 such as the servers 130 and/or storage subsystems 140 are referred to herein as entities. The entities and organization of entities of the DPS 100 is referred to herein as an entity configuration. The entity configuration of the DPS 100 may regularly change. For example, an administrator may add additional servers 130 to the DPS and/or remove a storage subsystem 140 from the DPS 110. Thus over time there is a plurality of entity configuration instances.

Each entity may also have one or more properties. For example, properties of a storage subsystem 140 may be the number of storage devices 170 in the storage subsystem 140, the total storage capacity of the storage subsystem 140, the number of volumes provisioned on the storage subsystem 140, and the like. Properties may also be changed. For example, the administrator may add storage devices 170 to the storage subsystem 140, changing the properties of the storage subsystem 140.

Figure 2:
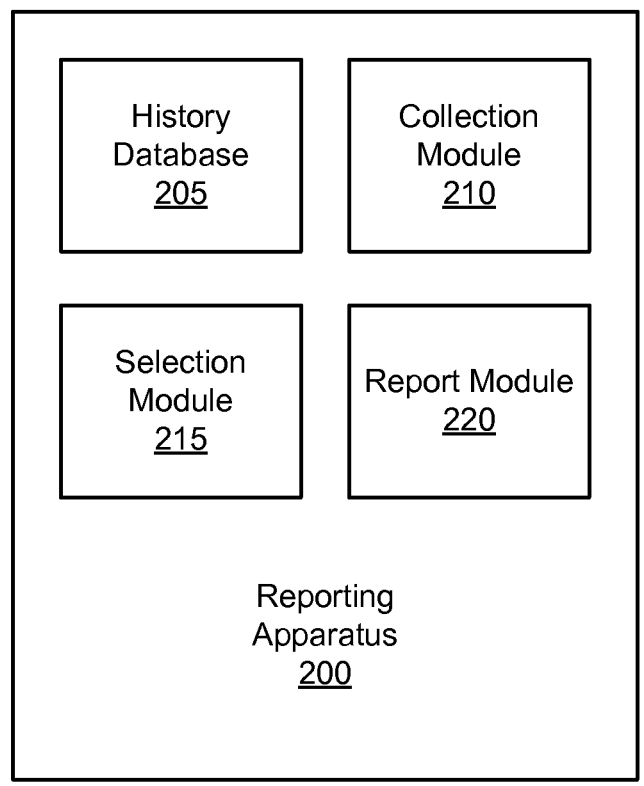
FIG. 2 is a schematic block diagram illustrating one embodiment of a reporting apparatus of the present invention.

FIG. 2 is a schematic block diagram illustrating one embodiment of a reporting apparatus 200 of the present invention. The apparatus 200 may be embodied in a computer such as a server 130 and/or a client 110 of FIG. 1. The apparatus 200 includes a history database 205, a collection module 210, a selection module 215, and a report module 220. The description of the apparatus 200 refers to elements of FIG. 1, like numbers referring to like elements.

In one embodiment, the history database 205, collection module 210, selection module 215, and report module 220 are configured as a computer program product that includes a computer useable medium with a computer readable program. The computer readable program is executed on the computer.

The collection module 210 records a plurality of entity configurations for the DPS 100 in the history database 205. For example, the collection module 210 may record the entity configuration instance depicted in FIG. 1 in the history database 205. If the administrator subsequently added a third server, the collection module 210 may record another entity configuration instance for the DPS 100 with the added server in the history database 205.

In one embodiment, the collection module 210 queries the entities of the DPS 100 for each entity's status. For example, the collection module 210 may query a first storage subsystem 140*a* and the first storage subsystem 140*a* may respond with a status specifying that the first storage subsystem 140*a* is on line with a storage capacity of six terabytes (6 TB) that is fifty-five percent (55%) utilized. The querying can be done by one or more industry standard management protocols published in the prior art, such as storage management initiative-specification (SMI-S), simple network management protocol (SNMP), and the like.

In an alternate embodiment, the collection module 210 may receive configuration updates from the administrator and/or a management tool. For example, the administrator may communicate to the collection module 210 that a storage device 170 is added to the storage subsystem 140. The collection module 210 may organize the collected entity status information in the history database 205 as an entity configuration.

In one embodiment, the collection module 210 comprises a plurality of collectors. A collector may monitor a source of entity configuration information. For example, the collector may monitor commands issued from a DPS management tool that modify the entity configurations of the DPS 100. Alternatively, the collector my receive reports of changes from the DPS management tool. Alternatively, the collector may periodically query every entity whose configuration history is of interest to the administrator. In yet another alternate embodiment, the collector may periodically directly access the database maintained by a DPS management tool that stores the live configuration of the DPS 100, and use the result of such accesses to build up the plurality of entity configurations of the DPS 100 in the history database 205.

The collector may be configured as a computer program that monitors a specified data port. The collector may parse messages communicated through the port. In addition, the collector may store data from the messages in the history database 205. Two or more collectors may concurrently store data to the history database 205 if each set of data relates to DPS transactions that do not conflict.

The history database 205 may include one or more tables as is well known to those of skill in the art. In one embodiment, the history database 205 includes a version table. The version table may record each entity configuration instance with a unique version identifier and one or more time stamps.

The history database 205 may also include one or more entity history tables. The entity history tables may record the status and properties of entities. For example, an entity history table may include a plurality of entries for a storage subsystem 140. Each entry in the entity history table may include a version identifier that links the entry to an entity configuration instance. An entry in the entity history table may also include details of an entity's properties during the entity configuration instance. For example, an entry may specify the storage capacity of a storage subsystem 140 for the entity configuration instance, or the number of storage volumes provisioned on storage subsystem 140 for the entity configuration instance.

In addition, the history database 205 may include one or more fixed-entity tables. Each fixed-entity table may record the status and properties of the entities of the current entity configuration instance.

In one embodiment, the selection module 215 selects a subset of entities of the DPS 100 as will be described hereafter. In addition, the selection module 215 may select one or more entity configuration instances. For example, the selection module 215 may select a June 1 entity configuration and a July 31 entity configuration.

The report module 220 generates a historical report of the plurality of entity configurations. In addition, the report module 220 may generate the historical report for the subset of the entities and/or entity configuration instances that is selected by the selection module 215.

Figure 3:
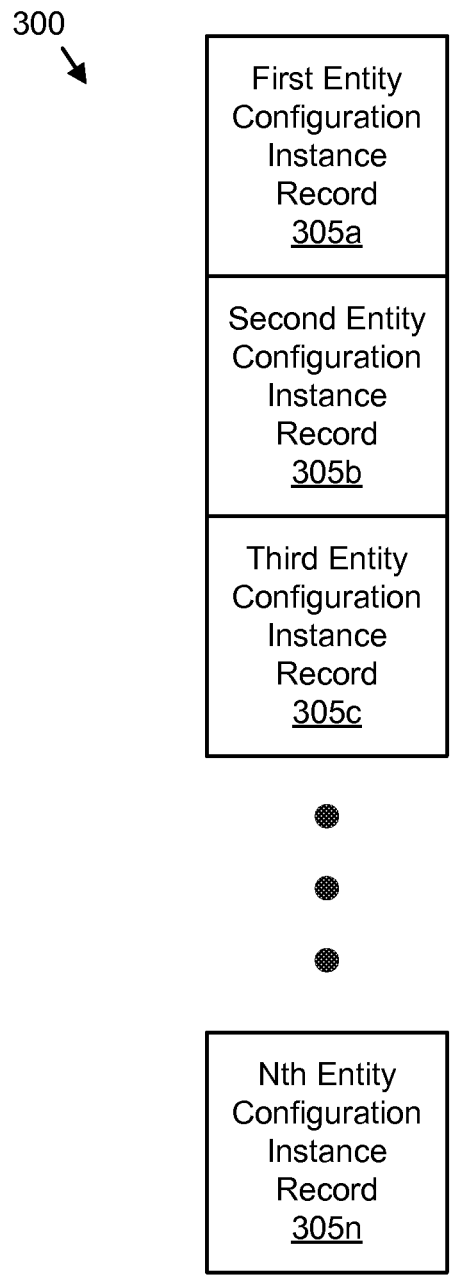
FIG. 3 is a schematic block diagram illustrating one embodiment of a complete instance history database of the present invention.

FIG. 3 is a schematic block diagram illustrating one embodiment of a complete instance history database 300 of the present invention. The complete instance history database 300 may be the history database 205 of FIG. 2. The description of the complete instance history database 300 refers to elements of FIGS. 1-2, like numbers referring to like elements.

The embodiment of the complete instance history database 300 includes a plurality of entity configuration instance records 305. Each entity configuration instance record 305 includes data detailing an entity configuration instance. For example, a first entity configuration instance record 305a may record each entity of the DPS 100 of FIG. 1 along with each entity's properties. If the administrator removes the second server 130b from the DPS 100, a second entity configuration instance record 305b may record the new entity configuration instance of the DPS 100.

In one embodiment, the collection module 210 records each entity configuration instance so that there is an entity configuration instance record 305 for each entity configuration instance. Alternatively, the collection module 210 may periodically record an entity configuration in an entity configuration instance record 305. For example, the collection module 210 may record an entity configuration instance as the instance exists at 1:00 am each day.

Figure 4:
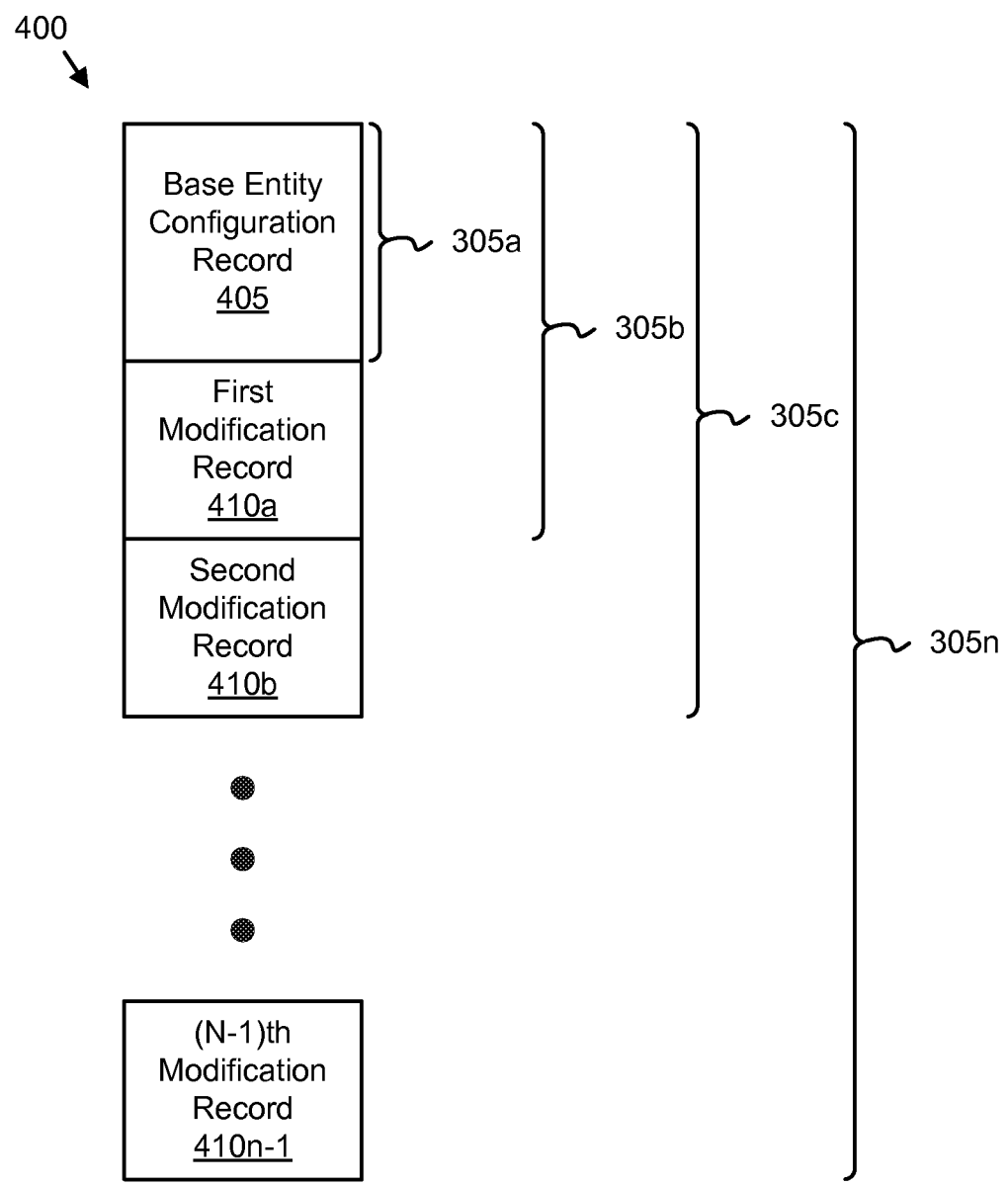
FIG. 4 is a schematic block diagram illustrating one embodiment of an incremental history database of the present invention.

FIG. 4 is a schematic block diagram illustrating one alternate embodiment of an incremental history database 400 of the present invention. The incremental history database 400 may be the history database 205 of FIG. 2. The description of the incremental history database 400 refers to elements of FIGS. 1-3, like numbers referring to like elements.

The depicted embodiment of the incremental history database 400 includes a base entity configuration record 405 and one or more modification records 410. The base entity configuration record 405 may record each entity configuration of the DPS 100 along with each entity's properties. Thus the base entity configuration record 405 is substantially equivalent to the first entity configuration instance record 305a.

Each modification record 410 records modifications to the DPS entity configuration instance that is recorded in the base entity configuration record 405. Continuing the example of FIG. 3, if the administrator removes the second server 130b from the DPS 100, a first modification record 410a may record the deletion of the second server 130b.

The base entity configuration record 405 combined with the first modification record 410a is substantially equivalent to the second entity configuration instance record 305b of FIG. 3. Similarly, the base entity configuration record 405 combined with the first and second modification records 410a, 410b is substantially equivalent to the third entity configuration instance record 305c while the base entity configuration record 405 combined with the first through nth modification records 410a-410n is substantially equivalent to the nth entity configuration instance record 305n.

The incremental history database 400 records entity configuration information that is equivalent to the complete instance history database 300. However, because the modification records 410 record a significantly smaller quantity of data than the entity configuration instance records 305, the incremental history database 400 requires less storage space than the complete instance history database 300.

Figure 5:
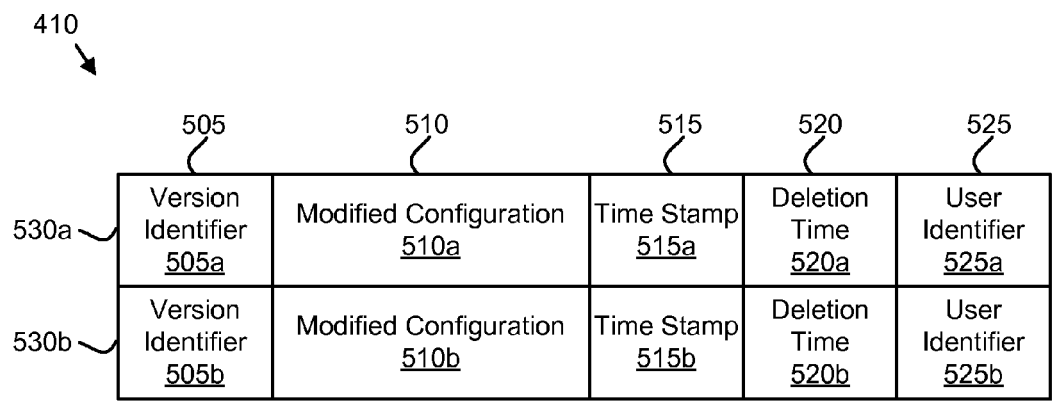
FIG. 5 is a schematic block diagram illustrating one embodiment of modification records of the present invention.

FIG. 5 is a schematic block diagram illustrating one embodiment of modification records 410 of the present invention. The modification records 410 are the modification records 410 of FIG. 4. The description of the modification records 410 refers to elements of FIGS. 1-4, like numbers referring to like elements.

Two modification records 410 are depicted. However, an incremental history database 400 may include any number of modification records 410. Each modification record 410 may be a row 530 in a database table. Each row 530 may include a plurality of columns 505, 510, 515, 520, 525. Five exemplary columns 505, 510, 515, 520, 525 are shown, although one of skill in the art will recognize that any number of columns 505, 510, 515, 520, 525 may record information about multiple aspects of an entity configuration.

A version identifier column 505 may record the version identifier of the modification record in the version table. The value of version identifier column 505 may index a modification record 410 to an entity configuration instance specified by the version table.

The modified configuration column 510 may record a modification to the DPS 100. Continuing the example of FIGS. 3 and 4, a first row 530a may be the first modification record 410a and may record the removal of the second server 130b in the modified configuration column 510a of the first row 530a.

In one embodiment, a time stamp column 515 may store a time value of a modification. Continuing the example above, a time stamp column 515a of the first row 530a may record a time of the removal of the second server 130b. The deletion time column 520 may record a deletion time value specifying a time of a removal modification, wherein an entity is removed from the DPS 100. Continuing the example above, the deletion time column 520a of the first row 530a may record the time of the removal of the second server 130b. The deletion time column 520 records a null value for modifications that do not remove an entity from the DPS 100. In an alternate embodiment the deletion time column may record a version identifier that can be correlated to a clock time when the removal modification happened. Continuing the example above, the deletion column 520a of the first row 530a may record the value of the version in effect when second server 130b was removed. This could be an integer value that maps to the clock time when the second server 130b was removed.

In one embodiment, the user identifier column 525 records an identifier for a user making the modification. Continuing the example above, the user identifier column 525a of the first row 530a may record an identifier number for the administrator who removed the second server 130b from the DPS 100. Alternatively, the user identifier column 525 may record a name. Recording the user identifier value in the user identifier column 525 supports auditing changes to entity configurations as will be described hereafter.

Figure 6:
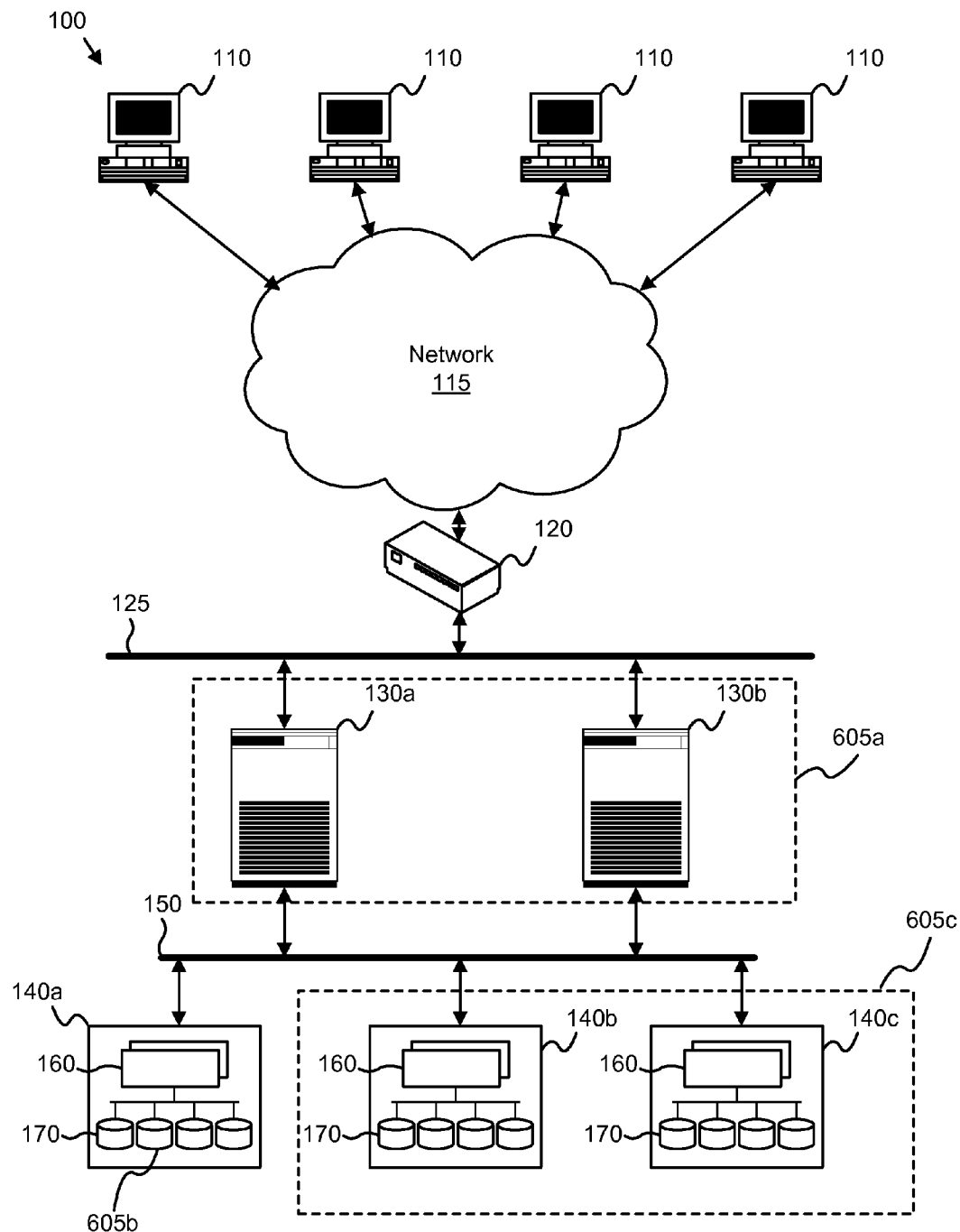
FIG. 6 is a schematic block diagram illustrating one embodiment of selected entities of an enterprise data processing system of the present invention.

FIG. 6 is a schematic block diagram illustrating one embodiment of selected entities 605 of a DPS 100 of the present invention. The DPS 100 of FIG. 1 is shown with a plurality of selected entities 605 indicated by annotation lines and/or dotted line boxes. The selection module 215 may select one or more entities as selected entities 605. The selected entities 605 may share a characteristic. For example, the servers 130 are shown as a first selected entity 605a. Alternatively, the selection module 215 may arbitrarily select entities. For example, FIG. 6 shows second and third storage subsystems 140b, 140c as selected entities 605c. A single entity may also be a selected entity, as illustrated by the selection of a storage device 170 as a selected entity 605b.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 7:
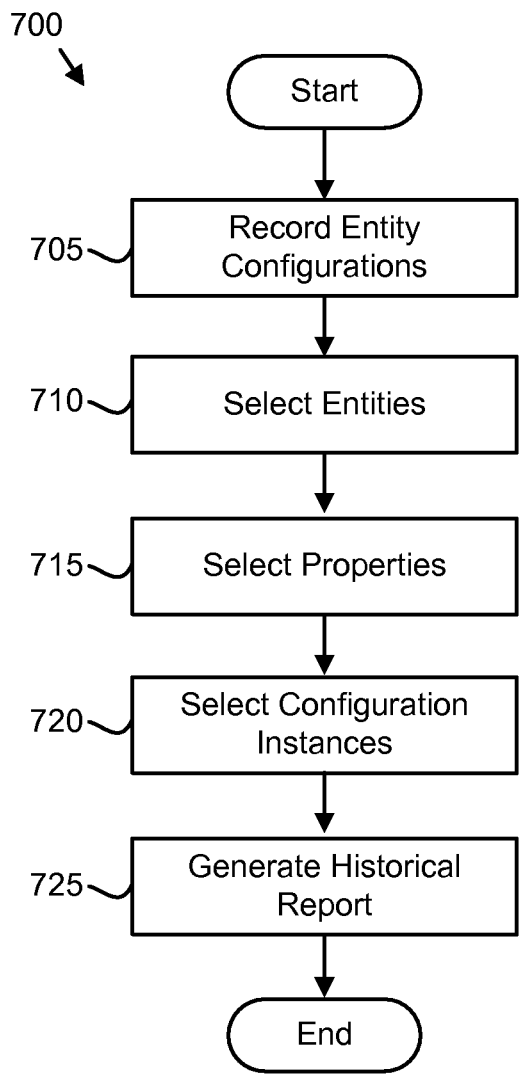
FIG. 7 is a schematic flow chart diagram illustrating one embodiment of a reporting method of the present invention.

FIG. 7 is a schematic flow chart diagram illustrating one embodiment of a reporting method 700 of the present invention. The method 700 substantially includes the steps to carry out the functions presented above with respect to the operation of the described apparatus and system of FIGS. 1-6. The description of the method 700 refers to elements of FIGS. 1-6, like numbers referring to like elements. In one embodiment, the method 700 may be implemented with a computer program product comprising a computer readable medium having a computer readable program. A computer such as the server 130 and/or the clients 110 executes the computer readable program.

The method 700 begins, and the collection module 210 records 705 a plurality of entity configurations for the DPS 100 in the history database 205. The collection module 210 may query one or more entities for the properties of the entities. The queried entities may respond with property descriptions. The collection module 210 may parse the property descriptions and record information parsed from the property descriptions in the history database 205. The collection module 210 may also record that an entity is not available on the DPS 100 if the entity does not respond to the query. In one embodiment, the collection module 210 employs collectors to collect and record the entity configuration information.

In one embodiment, the collection module 210 records 705 change events in the history database 205. For example, if the administrator adds a third server to the DPS 100, the collection module 210 may record 705 the addition as a change event. In a certain embodiment, the collection module 210 receives and records 705 notices of change events. In another embodiment, the collection module 210 may directly query a fixed entity database that contains the last known entity configurations for the DPS 100. The fixed entity database may be directly populated by a DPS management tool that monitors the current DPS configuration.

In one embodiment, the selection module 215 selects 710 a subset of the entities of the DPS 100 as selected entities 605. The selection module 215 may select 710 the selected entities 605 as directed by the administrator. For example, the administrator may direct the selection module 215 to select 710 all storage subsystems 170 through a graphical user interface (GUI). The GUI may display graphic representations of the entities and the administrator may direct the selection module 215 by selecting one or more graphical representations with a mouse. Alternatively, a script such as a batch file may direct the selection module 215 to select 710 specified entities. The selected entities 605 may be of interest to the administrator. In one embodiment, reports are only generated for the selected entities 605 as will be described hereafter.

The selection module 215 may further select 715 one or more properties of each entity. The administrator may direct the selection module 215 as to which properties to select 715. For example, the administrator may choose properties for servers 130 from a checklist menu of the GUI that displays server properties.

In one embodiment, the selection module 215 selects 720 one or more entity configuration instances. The administrator may direct the selection module 215 to select 720 specified entity configuration instances, possibly by using a GUI and a mouse. Alternatively, a script may direct the selection module 215 to select 720 specified entity configuration instances.

The report module 220 generates 725 a historical report of the plurality of entity configurations and the method 700 terminates. In one embodiment, the report module 220 generates the historical report for the selected entities 605. For example, the historical report may only include the selected entities 605c comprising the second and third storage subsystems 140 as shown in FIG. 6.

In addition, the report module 220 may generate 725 the historical report for the selected properties. For example, if the selection module 215 selected 715 the property of storage capacity in step 715, the report module 220 may generate 725 the historical report for storage capacities.

In one embodiment, the report module 220 generates 725 the historical report for the selected entity configuration instances. For example, if the selection module 215 selects 720 the entity configuration instances from June 1 through June 10, the report module 220 generates 725 the historical report for the entity configurations from June 1 through June 10.

The historical report may be selected from a function-of-time report, a system difference report, a policy check report, a point-in-time report, and an audit report. Embodiments of the function-of-time report, system difference report, policy check report, point-in-time report, and audit report will be described hereafter.

An administrator may use the historical report to identify trends in the operation and utilization of the DPS 100. For example, the administrator may observe that a certain collection of storage devices 170 is not heavily used. The administrator may conclude that the said collection of storage devices 170 of the storage subsystem 140 does not need to be expanded to handle future loads. This conclusion would be invalid if the original measurements had been made at a time when the number of network connections used to send data to the storage devices 170 was too small to accommodate a heavy load. If the current DPS 100 includes a larger number of connections, the administrator may decide to increase the storage devices 170 in the storage subsystem 140. The historical report helps the administrator take this action, because the report depicts the increased number of network connections that can be used to send data to the storage devices 170, as compared to an earlier point in time.

Figure 8:
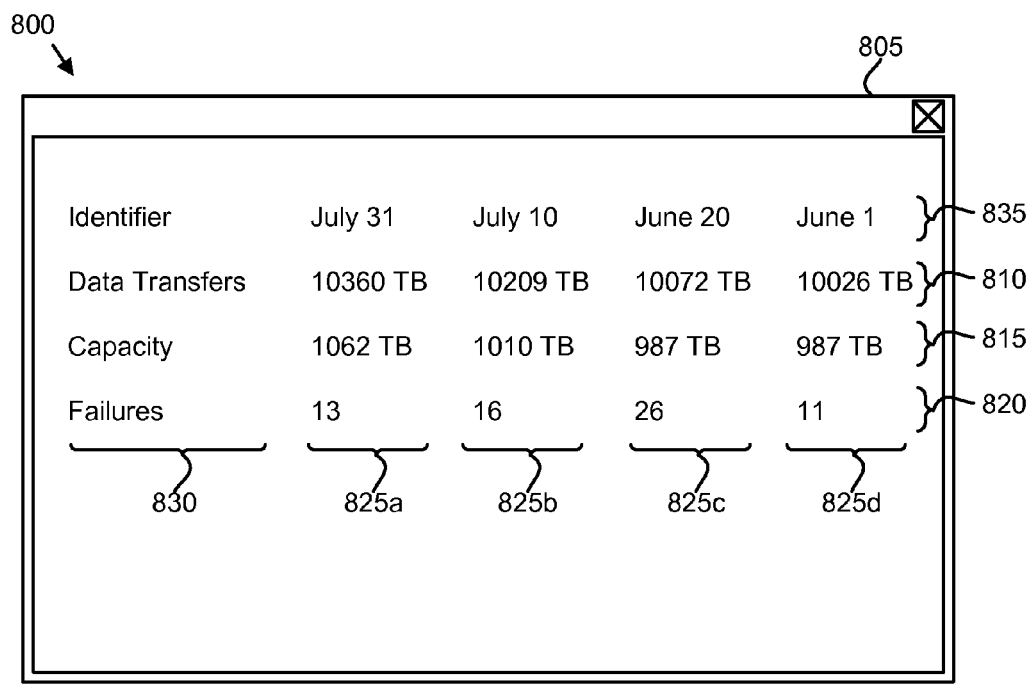
FIG. 8 is an illustration of one embodiment of a function-of-time report of the present invention.

FIG. 8 is an illustration of one embodiment of a function-of-time report 800 of the present invention. The function-of-time report 800 is shown displayed within a GUI window 805 that may be rendered on a monitor of a client 110 as is well known to those of skill in the art.

The function-of-time report 800 shows configuration data for at least two specified entity configurations. In the depicted report 800, data transfer data 810, used capacity data 815, and failure data 820 are displayed for four selected entity configuration instances 825a-d. The function-of-time report 800 includes labels 830 identifying the configuration data elements. In the depicted example the labels 830 "Data Transfers," "Capacity," and "Failures" identify data transfer data 810, used capacity data 815, and failure data 820 rows respectively. The function-of-time report 800 also includes instance identifiers 835. As depicted, the instance identifiers 835 identify "July 31," "July 10," "June 20," and "June 1" entity configuration instances.

The function-of-time report 800 provides trend information to the administrator. In a prophetic example, the administrator may use the depicted function-of-time report 800 to estimate the number of storage devices 170 to install in coming months to keep up with increasing storage capacity demands. In an alternate embodiment, the function-of-time report 800 provides trend information in a graphical format such as a line chart, a bar chart, and the like.

Figure 9:
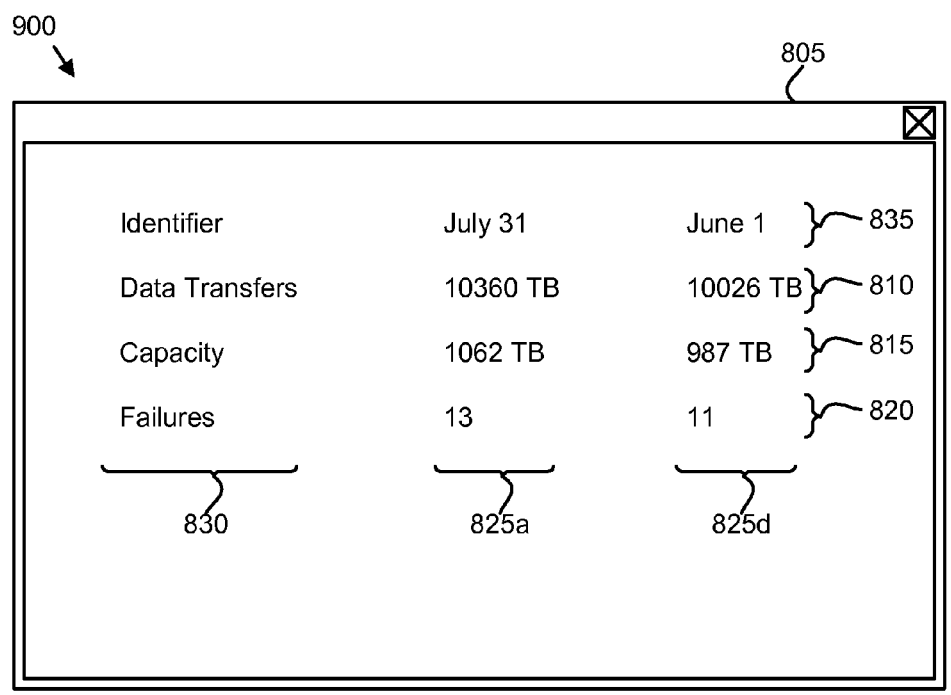
FIG. 9 is an illustration of one embodiment of a system difference report of the present invention.

FIG. 9 is an illustration of one embodiment of a system difference report 900 of the present invention. The system difference report 900 is shown displayed within the GUI window 805. The system difference report 900 shows differences between at least two specified entity configuration instances.

The depicted embodiment of the system difference report 900 shows data transfer data 810, used capacity data 815, and failure data 820 parameters displayed in rows for two selected entity configuration instances 825a, 825d. The report 900 includes the labels 830 "Data Transfers," "Capacity," and "Failures" identify data transfer data 810, capacity data 815, and failure data 820 rows respectively. The system difference report 900 also includes instance identifiers 835 that identify the "July 31" and "June 1" entity configuration instances 825a, 825d.

In an alternate embodiment, the system difference report 900 provides trend information in a graphical format such as a line chart, a bar chart, and the like. The system difference report 900 highlights differences between specified entity configuration instances. The report 900 may allow the administrator to identify differences that result in degradation to DPS performance.

FIG. 10 is an illustration of one embodiment of a policy check report 1000 of the present invention. The policy check report 1000 is shown displayed within a GUI window 805. In one embodiment, the policy check report 1000 identifies violations of a policy in a modification from a first entity configuration to a second entity configuration.

The report module 220 may compare differences between the first and second entity configuration to identify changes to the first entity configuration. The report module 220 may further compare the identified changes to one or more policies. The policy may describe allowable changes. In one embodiment, the policy is stored in a file. The report module 220 may generate the policy check report 1000 if a change to the DPS 100 violates a policy.

The depicted policy check report 1000 lists a policy violation record 1010. Labels 830 identify the elements of the policy violation record 1010. In the depicted example, the policy violation record 1010 includes a date 1005 of a policy violation, a modification description 1015 that describes the modification, and a violation description 1020 that describes the policy violation. In one embodiment, the date 1005 may be the date value from the time stamp column 515 and the modification description 1015 may be the value from the modified configuration column 510.

The policy check report 1000 may alert the administrator to changes that could lead to failures and/or degraded DPS performance. In the depicted example of the policy check report 1000, the report 1000 informs the administrator that an added RAID controller such as a storage controller 160 is configured as a RAID 1 controller. This may violate a policy that requires all RAID controllers to be configured as RAID 5 controllers.

FIG. 11 is an illustration of one embodiment of a point-in-time report 1100 of the present invention. The point-in-time report 1100 is shown displayed within a GUI window 805. The point-in-time report 1100 shows data processing system configuration data for a specified entity configuration instance.

The depicted point-in-time report 1100 shows configuration data for one specified entity configuration instance. The configuration data includes data transfer data 810, used capacity data 815, failure data 820, storage loop data 1105, and disk drive data 1110 for the specified entity configuration instance. The labels 830 "Data Transfers," "Capacity," "Failures," "Storage Loops," and "Disk Drives" identify the configuration data elements. The instance identifier 835 identifies the specified entity configuration instance as the "July 31" entity configuration instance.

The point-in-time report 1100 may provide the administrator with detailed information on the specified entity configuration instance. In a prophetic example, the administrator may employ the point-in-time report 1100 to analyze a past entity configuration instance that did not exhibit a current failure mode.

FIG. 12 is an illustration of one embodiment of an audit report 1200 of the present invention. The audit report 1200 is shown displayed within a GUI window 805. The audit report 1200 shows identities of users making changes to entity configurations.

The depicted audit report 1200 lists users 1210 initiating modifications to the DPS 100. Labels 830 identify the modifications 1205 and the initiating users 1210. The audit report 1200 also includes dates 1005 of modifications to the DPS 100.

In one embodiment, the report module 220 generates 725 the date 1005 of the modifications from the time stamp column 515 of a modification record row 530, the modifications 1205 from the modified configuration column 510 of the modification record row 530, and the initiating user 1210 from the user identifier column 525 of the modification record row 530. The administrator may use the audit report 1200 to audit accountability for DPS modifications.

The embodiment of the present invention records 705 a plurality of entity configurations for the DPS 100. In addition, the present invention generates 725 the historical report from the plurality of entity configurations. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An enterprise data processing system reporting apparatus, the apparatus comprising:

a collection module configured to monitor commands issued from a management tool that modify entity configurations for a plurality of entity configurations of the enterprise data processing system at a port, parse the commands, query the plurality of entity configurations, record the plurality of entity configuration instances for entities at a specified time for the enterprise data processing system in a history database from the monitored commands wherein entities that do not respond to the query are recorded as unavailable, the enterprise data processing system comprising the entities, the entities comprising storage subsystems, each entity configuration instance comprising a modification for at least one entity from a first entity configuration comprising first entities and an organization of the first entities to a second entity configuration comprising second entities and an organization of the second entities and at least one entity property for each entity, the entity property comprising a number of storage devices property;

a selection module configured to select a subset of the entities of the enterprise data processing system, select properties of the entity configurations, and select entity configuration instances; and a report module configured to generate a historical report of differences between the selected entity properties of the selected subset of entities for the selected entity configuration instances, wherein at least a portion of the collection module, the selection module, and the report module comprise one or more of hardware and a computer readable program, the computer readable program stored on at least one non-transitory computer readable storage media.

2. The apparatus of claim 1, wherein the historical report identifies violations of a policy in the modification.

3. The apparatus of claim 1, wherein the historical report shows enterprise data processing system configuration data for the selected subset of entities.

4. The apparatus of claim 1, wherein the historical report shows identities of users making changes to entity configurations.

5. The apparatus of claim 1, wherein the collection module further comprises collectors configured to collect the modification.

6. The apparatus of claim 5, wherein the history database records the modification as a modification record of the history database.

7. The apparatus of claim 6, wherein each modification record, comprises a version identifier that uniquely identifies the modification record and a time stamp that records a time of the modification.

8. The apparatus of claim 7, wherein each modification record further comprises a deletion time, wherein the deletion time records a time an entity is deleted if the entity is deleted from the enterprise data processing system else records a null value if the entity is not deleted.

9. The apparatus of claim 7, wherein each modification record further comprises a modification identifier configured to identify a user making the modification to the entity configuration.

10. The apparatus of claim 1, wherein the plurality of entity configurations are queried using a storage management initiative—specification protocol, the plurality of entity configuration instances for entities are recorded at the specified time each day, the differences comprise modifications that are violations of a policy of allowable changes, each modification record comprises a version identifier that uniquely identifies the modification record, a time stamp that records a time of the modification, a deletion time, wherein the deletion time records a time an entity is deleted if the entity is deleted from the enterprise data processing system else records a null value if the entity is not deleted, a modification identifier configured to identify a user making the modification to the entity configuration, the historical report identifies violations of the policy in the modifications, the historical report shows enterprise data processing system configuration data for the selected subset of entities, users making changes to entity configurations, data transfers, capacity, failures, storage loops, and disk drives.

11. A computer program product comprising a non-transitory computer useable medium having a computer readable program, wherein the computer readable program when executed on a computer causes the computer to:

monitor commands issued from a management tool that modify entity configurations for a plurality of entity configurations of an enterprise data processing system at a port;
parse the commands;
query the plurality of entity configurations;
record the plurality of entity configuration instances at a specified time for the enterprise data processing system in a history database from the monitored commands wherein entities that do not respond to the query are recorded as unavailable, the enterprise data processing system comprising entities, the entities comprising storage subsystems, each entity configuration instance comprising a modification for at least one entity from a first entity configuration comprising first entities and an organization of the first entities to a second entity configuration comprising second entities and an organization of the second entities and at least one entity property for each entity, the entity property comprising a number of storage devices property; and
select a subset of the entities of the enterprise data processing system;
select properties of the entity configurations;
select entity configuration instances; and
generate a historical report of the differences between the selected entity properties of the selected subset of entities for the selected of entity configuration instances.

12. The computer program product of claim 11, wherein the historical report shows configuration data for at least two specified entity configurations.

13. The computer program product of claim 11, wherein the historical report identifies violations of a policy in the modification.

14. The computer program product of claim 11, wherein the historical report shows enterprise data processing system configuration data for the selected subset of entities.

15. The computer program product of claim 11, wherein the historical report shows identities of users making changes to entity configurations.

16. The computer program product of claim 11, wherein the plurality of entity configurations are queried using a storage management initiative—specification protocol, the plurality of entity configuration instances for entities are recorded at the specified time each day, the differences comprise modifications that are violations of a policy of allowable changes, each modification record comprises a version identifier that uniquely identifies the modification record, a time stamp that records a time of the modification, a deletion time, wherein the deletion time records a time an entity is deleted if the entity is deleted from the enterprise data processing system else records a null value if the entity is not deleted, a modification identifier configured to identify a user making the modification to the entity configuration, the historical report identifies violations of the policy in the modifications, the historical report shows enterprise data processing system configuration data for the selected subset of entities, users making changes to entity configurations, data transfers, capacity, failures, storage loops, and disk drives.

17. A system for managing an enterprise data processing system, the system comprising:

the enterprise data processing system comprising entities comprising a plurality of servers, storage subsystems, data processing devices, storages devices, and communication devices in mutual communication through at least one communication channel;
a computer in communication with the enterprise data processing system and comprising
a collection module configured to monitor commands issued from a management tool that modify entity configurations for a plurality of entity configurations of the enterprise data processing system at a port, parse the commands, query the plurality of entity configurations, record a plurality of entity configuration instances for entities at a specified times for the enterprise data processing system in a history database from the monitored commands wherein entities that do not respond to the query are recorded as unavailable, the enterprise data processing system comprising the entities, the entities comprising storage subsystems, each entity configuration instance comprising a modification for at least one entity from a first entity configuration comprising first entities and an organization of the first entities to a second entity configuration comprising second entities and an organization of the second entities and at least one entity property for each entity, the entity property comprising a number of storage devices property;

a selection module configured to select a subset of entities of the enterprise data processing system, select properties of the entity configurations, and entity configuration instances; and a report module configured to generate a historical report of differences between the selected entity properties of the selected subset of entities for the selected entity configuration instances.

18. The system of claim 17, wherein the historical report shows configuration data for at least two specified entity configurations.

19. The system of claim 17, wherein the historical report identifies violations of a policy in the modification.

20. The system of claim 17, wherein the historical report shows enterprise data processing system configuration data for the selected subset of entities.

21. The system of claim 17, wherein the historical report shows identities of users making changes to entity configurations.

22. The system of claim 17, wherein the plurality of entity configurations are queried using a storage management initiative—specification protocol, the plurality of entity configuration instances for entities are recorded at the specified time each day, the differences comprise modifications that are violations of a policy of allowable changes, each modification record comprises a version identifier that uniquely identifies the modification record, a time stamp that records a time of the modification, a deletion time, wherein the deletion time records a time an entity is deleted if the entity is deleted from the enterprise data processing system else records a null value if the entity is not deleted, a modification identifier configured to identify a user making the modification to the entity configuration, the historical report identifies violations of the policy in the modifications, the historical report shows enterprise data processing system configuration data for the selected subset of entities, users making changes to entity configurations, data transfers, capacity, failures, storage loops, and disk drives.

23. A method for deploying computer infrastructure, comprising integrating computer-readable code into a computing system, wherein the code in combination with the computing system performs the following:

monitoring commands issued from a management tool that modify entity configurations for a plurality of entity configurations of an enterprise data processing system at a port;

parsing the commands;

querying the plurality of entity configurations;

recording a plurality of entity configuration instances at a specified times for an enterprise data processing system in a history database from the monitored commands wherein entities that do not respond to the query are recorded as unavailable, the enterprise data processing system comprising entities, the entities comprising storage subsystems, each entity configuration instance comprising a modification for at least one entity from a first entity configuration comprising first entities and an organization of the first entities to a second entity configuration comprising second entities and an organization of the second entities and at least one entity property for each entity, the entity property comprising a number of storage devices property;

selecting a subset of entities of the enterprise data processing system;

selecting properties of the entity configurations;

selecting entity configuration instances; and generating a historical report of the differences between the selected entity properties of the selected subset of entities for the selected entity configuration instances.

24. The method of claim 23, wherein the historical report shows configuration data for at least two specified entity configurations.

25. The method of claim 23, wherein recording the plurality of entity configurations comprises:

collecting the modification;

recording the modification to an entity configuration as a modification record of the history database.

26. The method of claim 25, wherein each modification record comprises a version identifier that uniquely identifies the modification record and a time stamp that records a time of the modification.

27. The method of claim 26, wherein each modification record further comprises a deletion time that records a time an entity is deleted from the enterprise data processing system if the entity is deleted else records a null value if the entity is not deleted.

28. The method of claim 27, wherein each modification record further comprises a modification identifier configured to identify a user making the modification to the entity configuration.

29. The method of claim 23, wherein the plurality of entity configurations are queried using a storage management initiative—specification protocol, the plurality of entity configuration instances for entities are recorded at the specified time each day, the differences comprise modifications that are violations of a policy of allowable changes, each modification record comprises a version identifier that uniquely identifies the modification record, a time stamp that records a time of the modification, a deletion time, wherein the deletion time records a time an entity is deleted if the entity is deleted from the enterprise data processing system else records a null value if the entity is not deleted, a modification identifier configured to identify a user making the modification to the entity configuration, the historical report identifies violations of the policy in the modifications, the historical report shows enterprise data processing system configuration data for the selected subset of entities, users making changes to entity configurations, data transfers, capacity, failures, storage loops, and disk drives.

30. An apparatus for managing an enterprise data processing system, the apparatus comprising:

means for monitoring commands issued from a management tool that modify entity configurations for a plurality of entity configurations of the enterprise data processing system at a port, parsing the commands, querying the plurality of entity configurations, recording a plurality of entity configuration instances at a specified times for the enterprise data processing system in a history database from the monitored commands wherein entities that do not respond to the query are recorded as unavailable, the enterprise data processing system comprising entities, the entities comprising storage subsystems, each entity configuration instance comprising a modification for at least one entity from a first entity configuration comprising first entities and an organization of the first entities to a second entity configuration comprising second entities and an organization of the second entities and at least one entity property for each entity, the entity property comprising a number of storage devices property;

means for selecting a subset of entities of the enterprise data processing system, selecting properties of the entity configurations, and selecting entity configuration instances;

means for generating a historical report of differences between the selected entity properties of the selected subset of entities for the selected entity configuration instances, wherein the historical report shows configuration data for at least two specified entity configurations, identifies violations of a policy in the modification, shows enterprise data processing system configuration data for the selected subset of entities, and shows identities of users making changes to entity configurations.

31. The apparatus of claim 30, wherein the plurality of entity configurations are queried using a storage management initiative—specification protocol, the plurality of entity configuration instances for entities are recorded at the specified time each day, the differences comprise modifications that are violations of a policy of allowable changes, each modification record comprises a version identifier that uniquely identifies the modification record, a time stamp that records a time of the modification, a deletion time, wherein the deletion time records a time an entity is deleted if the entity is deleted from the enterprise data processing system else records a null value if the entity is not deleted, a modification identifier configured to identify a user making the modification to the entity configuration, the historical report identifies violations of the policy in the modifications, the historical report shows enterprise data processing system configuration data for the selected subset of entities, users making changes to entity configurations, data transfers, capacity, failures, storage loops, and disk drives.

* * * * *